June 11, 1968  G. D. PRENTICE  3,387,696
FEED DISTRIBUTOR
Filed Jan. 4, 1966  5 Sheets-Sheet 1
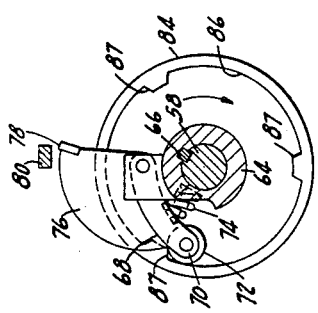
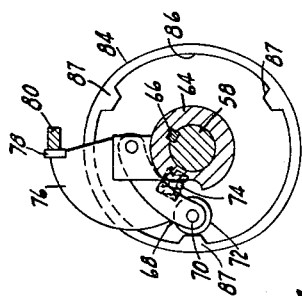
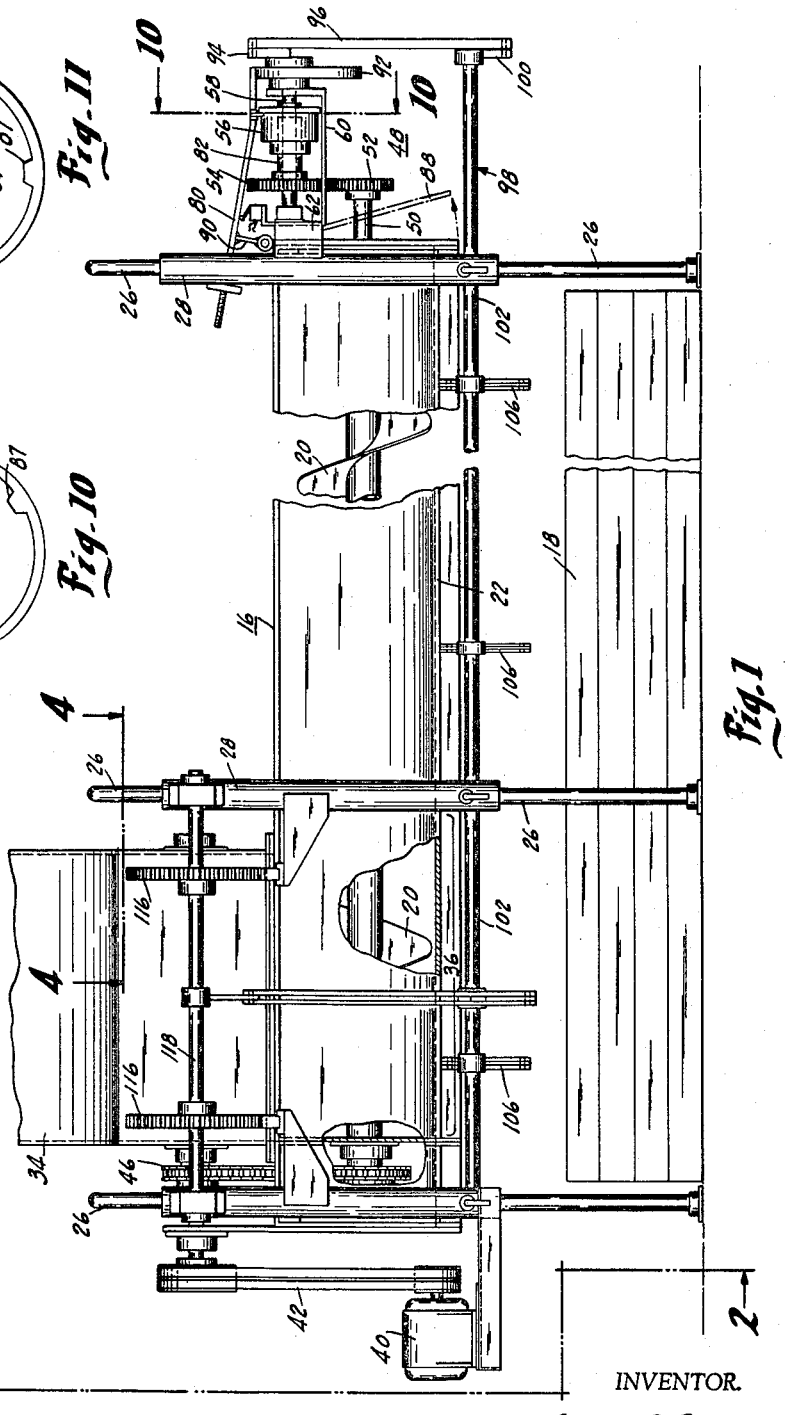
INVENTOR.
GEORGE D. PRENTICE
BY
Lieber & Nilles
ATTORNEY

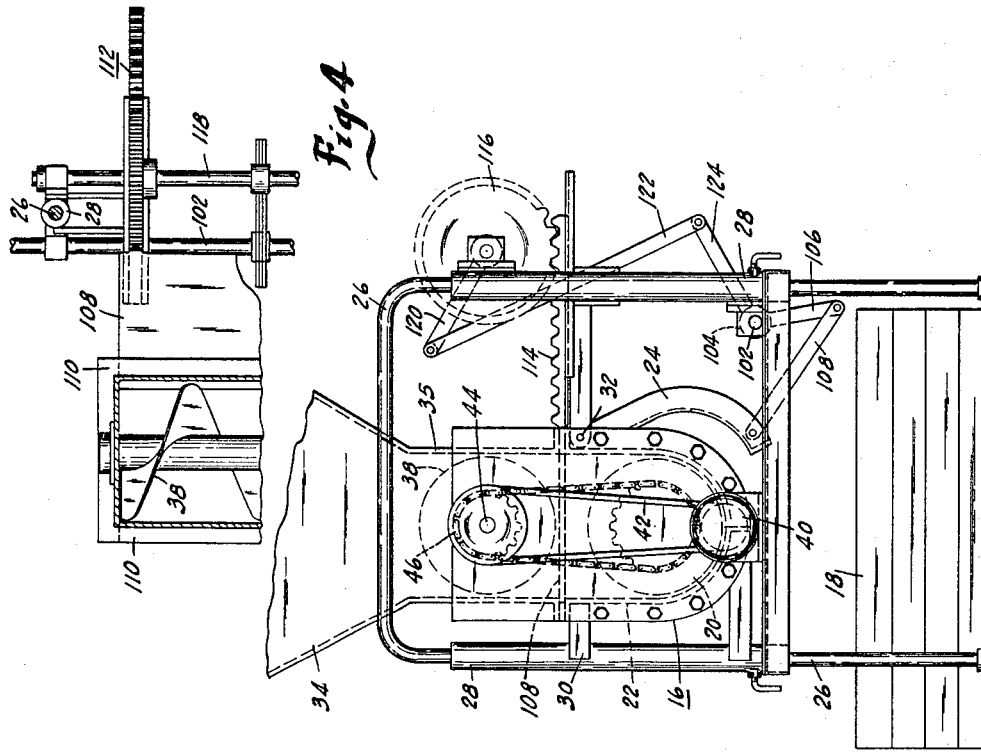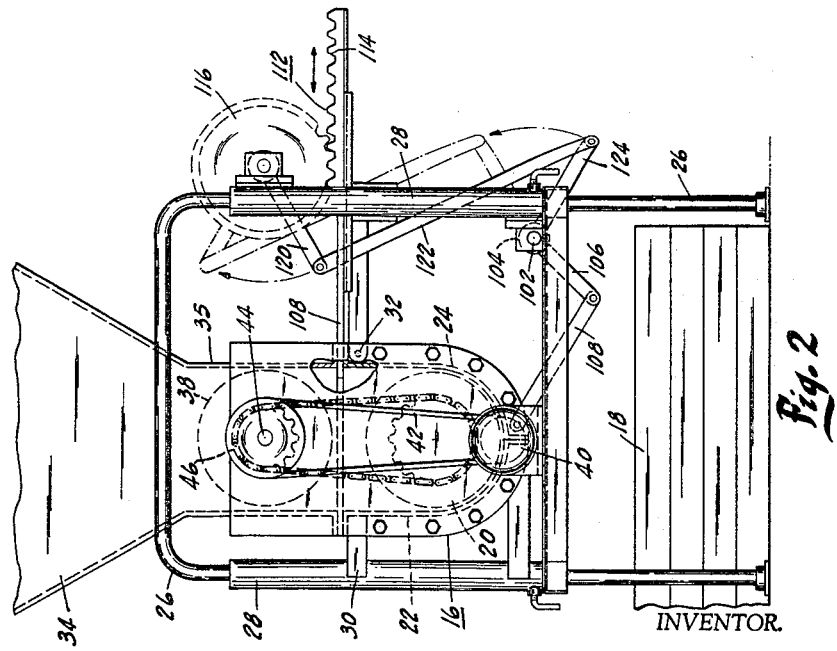

June 11, 1968 G. D. PRENTICE 3,387,696
FEED DISTRIBUTOR
Filed Jan. 4, 1966 5 Sheets-Sheet 3
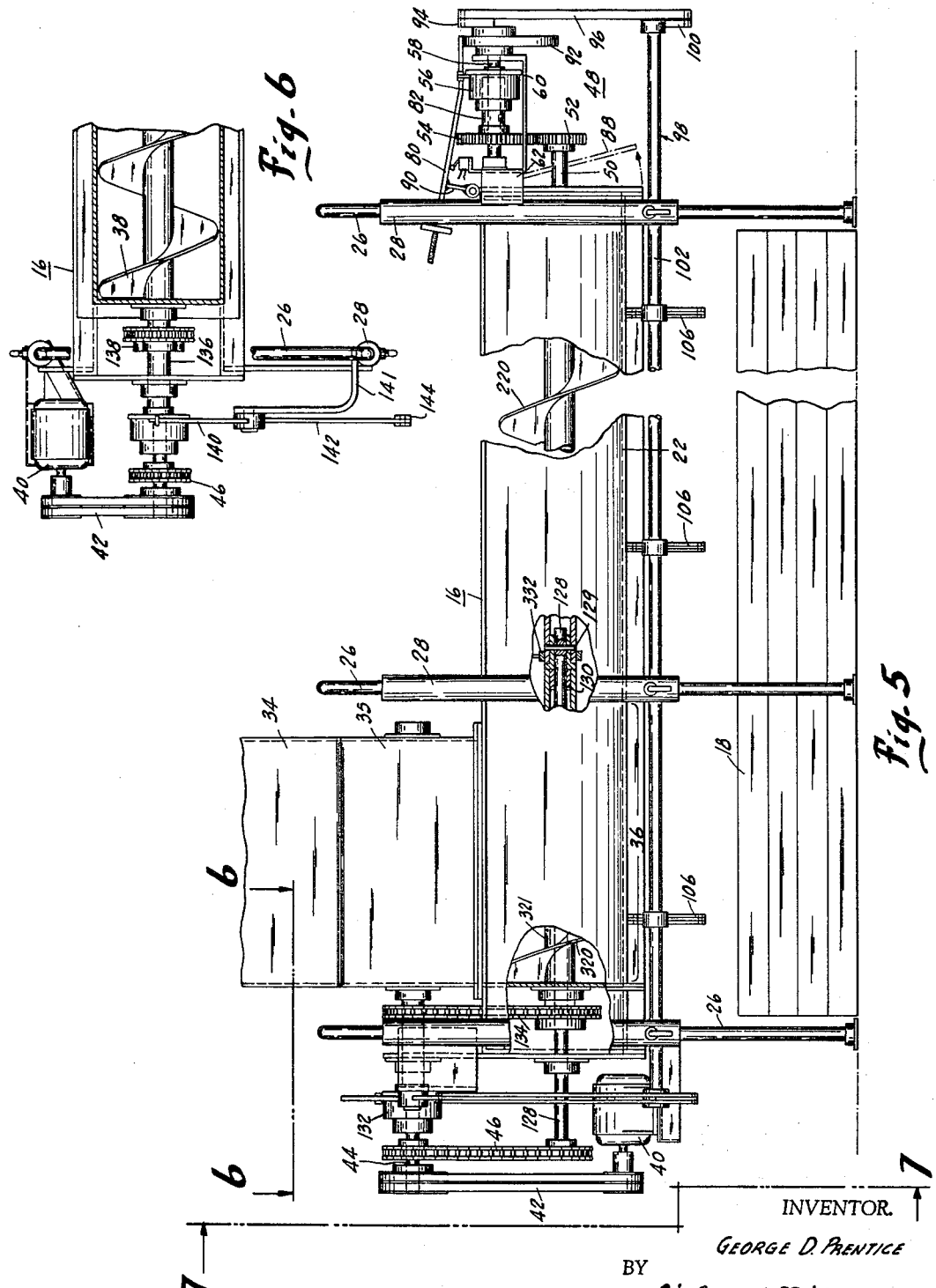
INVENTOR.
GEORGE D. PRENTICE
BY
Lieber & Niller
ATTORNEY INVENTOR.
GEORGE D. PRENTICE
BY
Lieber & Niller
ATTORNEY

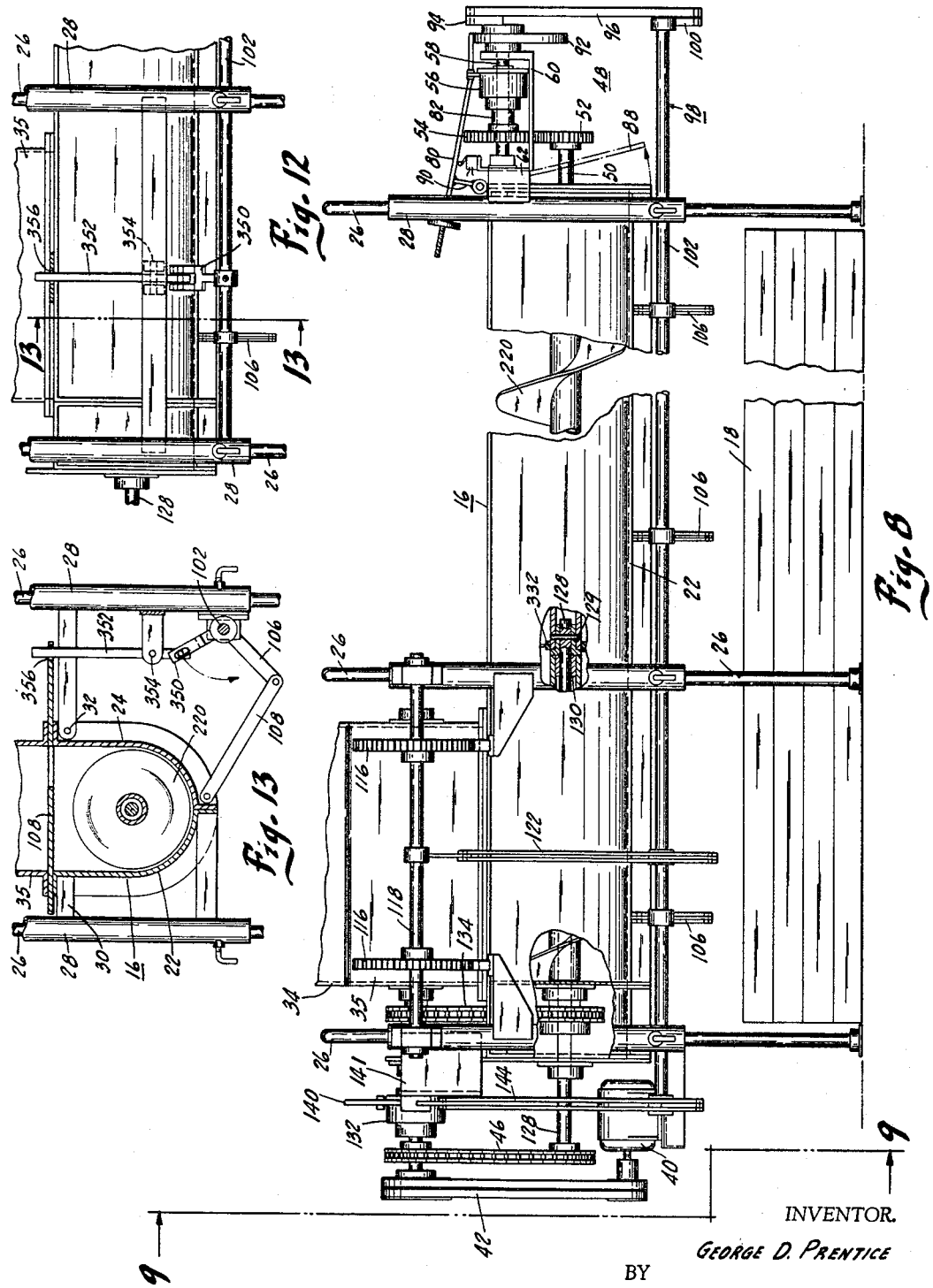

United States Patent Office 3,387,696
Patented June 11, 1968

3,387,696
FEED DISTRIBUTOR
George D. Prentice, Milwaukee, Wis., assignor to A. F. Klinzing Co. Inc., Milwaukee, Wis., a corporation of Wisconsin
Filed Jan. 4, 1966, Ser. No. 518,712
10 Claims. (Cl. 198—64)

ABSTRACT OF THE DISCLOSURE

A feed distributor for supplying material to an elongated bunker for simultaneous consumption by a group of animals and having an auger type feeder provided with means for even and uniform distribution of material along the entire length of the bunker from the portion adjacent the supply hopper to the end remote therefrom.

Background

Modern farming techniques, necessary for efficient and profitable operation of cattle feed lot and other animal raising endeavors, employ apparatus which has almost completely mechanized the preparation, storage, formulation and delivery of feeding material. Typically, the feed materials such as silage, haylage, corn, and feed supplements are stored in silos. When needed, the materials are delivered to a mixing hopper located at one end of an auger feeder. The mixing hopper contains a mixing auger or paddle for combining the various materials into the desired formulation. The combined materials then pass from the hopper into an initial feed portion of the auger feeder. The auger feeder, which is mounted over the feeding bunker, moves the material away from the hopper and distributes it along its length by means of an auger screw. When the auger feeder is filled, a gate means is opened to deposit the material in the bunker for consumption by the animals. Various controls are provided in the apparatus to regulate the composition, amount, and frequency of supply of material.

It has been a shortcoming of previously available auger feeders that they failed to distribute feed to the bunker equally along its entire length, resulting in a crowding of the animals at the filled portions, often causing only the more physically fit or stronger animals to receive sufficient food. In such prior feeders, an excess of material was commonly deposited in the bunker in the portion immediately adjacent the hopper due to the passage of large quantities of material directly from the hopper, through the initial feed portion of the auger feeder and then into the bunker when the gate means of the auger feeder was opened. Not only did this cause the above-mentioned crowding of animals, it also resulted in the waste of a considerable amount of material as the animals were, in many cases, prevented from getting to this portion of the bunker and consuming such material by the supply pipes, drive equipment and other apparatus attendant the hopper and the adjacent portion of the auger feeder and bunker.

Summary

It is, therefore, an object of this invention to provide an auger feeder containing an improved means to insure even distribution of material along the entire length of a coextensive feeding bunker, including the portion of the bunker directly adjacent the mixing hopper.

Another object of this invention is to provide an elongated auger feeder having a mixer hopper opening into an initial feed portion thereof to supply material to the feeder, a material distributing auger screw to move the material from the initial feed portion along the length of the feeder, a gate means to empty the material from the feeder into a coextensive bunker when open, and means to prevent excessive material from being emptied from the initial feed portion into the bunker when the gate means is open.

A further object of this invention is to provide an auger feeder having a means to prevent excessive material from being emptied from the mixing hopper, through the initial feed zone of the auger feeder and into the bunker when the gate means of the auger feeder is open, which comprises a means for segregating the hopper from the initial feed portion when the gate means is open.

Still another object of the present invention is to provide an auger feeder having novel and improved means to prevent excessive material from being emptied from the mixing hopper, through the initial feed portion of the auger feeder and into the bunker when the gate means of the auger feeder is open, such means comprising a sliding plate between the hopper and the initial feed portion of the auger feeder which segregates the hopper from the initial feed portion when the gate means is open.

Another object of this invention is to provide an auger feeder including means for completely segregating the hopper from the initial feed portion when the gate means of the auger feeder is open to prevent excessive material from being emptied from the initial feed portion into the bunker and for partially segregating the hopper from the initial feed portion of the auger feeder when the gate means is closed to meter the supply of material from the hopper to the initial feed portion.

A further object of this invention is to provide an auger feeder having means to prevent excessive material from being emptied from the initial feed portion of the auger feeder into the coextensive bunker when the auger feeder gate means is open and which includes means for arresting the material distributing action of the auger screw in the initial feed portion of the auger feeder when the gate means is open.

Yet another object of this invention is to provide an auger feeder incorporating novel means for preventing excessive material from being emptied from the initial feed portion of the auger feeder into the bunker when the auger feeder gate means is open and which comprises a material distributing auger having a stub auger screw mounted in the initial feed portion and a main auger screw extending along the remainder of the auger feeder and a coupling means for selectively driving the stub auger screw and the main auger screw uniformly when the gate means is closed to move material from the initial feed portion along the length of the feeder and for stopping the stub auger screw to arrest its material movement action and prevent excessive material from being emptied from the initial feed portion when the gate means is open.

A further object of this invention is to provide an elongated auger type bunk feeder having a hopper opening into an initial feed portion thereof to supply material to the feeder, a material distributing auger screw to move the material from the initial feed portion along the length of the feeder, a gate means to empty the material from the feeder when open, and means to prevent excessive material from being emptied from the initial feed portion when the gate means is open, including means for both segregating the hopper from the initial feed portion and for arresting the material movement action of the auger screw within the initial feed portion when the gate means is open.

Still another object of this invention is to provide an improved auger type bunk feeder which is simple, compact, and rugged in construction, and which is capable of substantially troublefree operation for substantial periods of time.

The drawings

Further objects and advantages of this invention, together with an understanding of its construction and its mode of operation, will become apparent from the following detailed description considered in conjunction with the appended drawings, forming a part thereof, and in which:

FIGURE 1 is a side view of a typical auger feeder embodying the present invention, portions thereof being broken away to show normally hidden structure;

FIGURE 2 is an end view taken in the direction of the arrows 2—2 of FIGURE 1 to show the various positions of the elements of the auger feeder;

FIGURE 3 is an end view similar to FIGURE 2 but showing the means for segregating the mixing hopper from the auger feeder in its closed position and the gate means in open position to deposit material in the bunker;

FIGURE 4 is a fragmentary top view of a portion of the auger feeder, taken along line 4—4 in FIGURE 1, and showing additional details of the means to segregate the mixing hopper from the initial feed portion;

FIGURE 5 is a side view of an auger feeder embodying means for arresting the material distributing action of the auger screw within the initial feed portion of the auger feeder when the gate means is open, parts again being broken away to reveal normally hidden structure;

FIGURE 6 is a fragmentary top view taken along line 6—6 of FIGURE 5 showing details of the drive means for the auger feeder of FIGURE 5;

FIGURE 8 is a side view of another auger feeder, with portions thereof broken away, showing both the means for segregating the mixing hopper from the initial feed portion of the auger feeder and the means for arresting the material movement action of the auger screw within the initial feed portion when the gate means is open;

FIGURE 10 is a transverse cross-sectional view along line 10—10 of FIGURE 1 showing a typical clutch which may be advantageously used in the drive mechanism of the auger feeder of the present invention, the clutch being shown in its disengaged position.

FIGURE 11 is a similar cross-sectional view of the clutch of FIGURE 10 but showing the clutch in its engaged position;

FIGURE 12 is fragmentary side view of an auger feeder of the same general type as that illustrated in FIGURE 1 but embodying a preferred form of actuating mechanism for the sliding door between the hopper and feed trough; and FIGURE 13 is a transverse section through the feeder of FIGURE 12 taken along the line 13—13 thereof.

Detailed description

Figure 9:
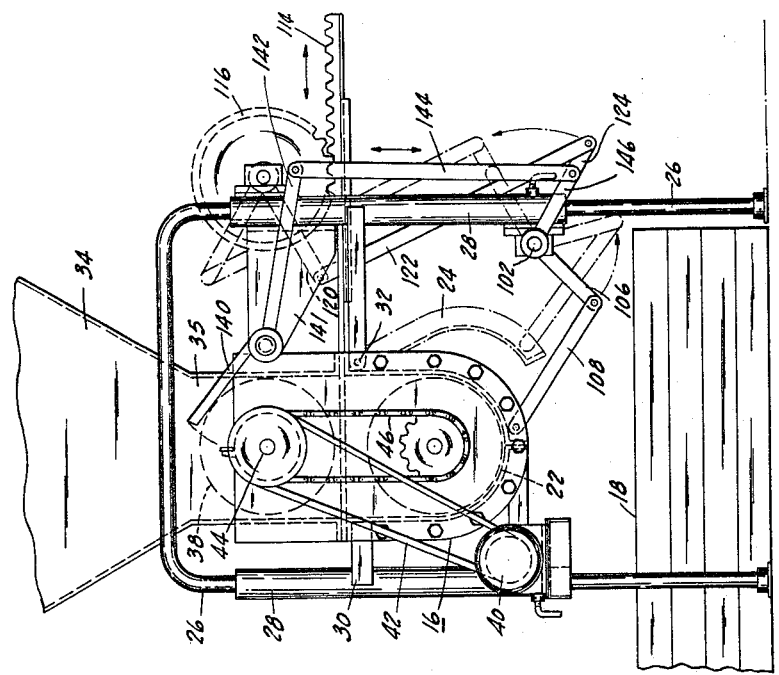
FIGURE 9 is an end view taken along line 9—9 of FIGURE 8, showing the various positions of the elements of the auger feeder when the gate means is closed in solid lines, and the position of the elements when the gate means is open in dot-and-dash lines.

Referring to the drawings, FIGURES 1, 2 and 3 show an embodiment of the invention incorporated in a typical auger feeder 16. It will be understood that both the auger feed 16 and the associated feed bunker 18 may be of any required length. As is customary, the auger feeder 16 includes a material distributing auger screw 20 operating in a trough or conduit 22, one side of which is defined by a longitudinal swingably suspended gate 24 for feeding material to the bunker 18. It will, however, be appreciated that both sides of the conduit may be provided with swingable gates if desired. The auger feeder 16 may be supported above bunker 18 as by means of standards 26 on which are positioned movable collars 28. Collars 28 contain suitable supports 30 for the conduit 22 which may include the pivots 32 for suspension of the gate 24. Collars 28 are preferably adjustable to permit the same to be raised or lowered on standards 26 and thereby position the auger feeder 16 to various desired heights.

A supply hopper 34 is mounted above the auger feeder 16 at one end thereof to supply material through neck 35 to an initial feed portion 36 of conduit 22 by gravity. The hopper 34 generally houses a mixing auger or paddle 38 for mixing the ingredients supplied to the hopper from a plurality of silos or bulk storage containers (not shown) before distribution to the feed bunker.

Both the material distributing auger 20 and mixing auger 38 may be driven from a common drive source, shown illustratively as an electric motor 40. Specifically, motor 40 is drivingly connected as by drive belts 42, to a jack shaft 44 which powers the mixing auger 38. Jack shaft 44, in turn, rotates the material distributing auger 20 as by means of a chain 46.

Rotation of the auger 20 within the conduit 22 moves the material deposited in the initial feed portion 36 along the length of auger feeder 16 to fill the conduit. When the conduit 22 is filled, it is necessary to provide a means for opening gate 24 to deposit the material in the bunker 18 and for thereafter closing gate 24 to permit conduit 22 to be refilled for subsequent operations. While gate 24 may be operated by hand, more advanced bunk feeders include means for automatically opening the gate 24 when the feeder is full and for automatically closing the gate when the desired amount of material has been deposited in bunker 18. A suitable gate opening and closing means is shown in the figures and is designated generally by the numeral 48, hereinafter described.

As shown, the shaft extension 50 of the material distributing auger 20 contains a gear 52 meshing with gear 54 which provides input power to a suitable clutch 56. Clutch 56 may be any one of the commonly used devices for selectively providing power from an input shaft to an output shaft in response to the movement of an actuating arm. A typical clutch suitable for such a purpose is shown, by way of example, in FIGURES 10 and 11.

In the device illustrated, the output shaft 58 of the clutch is suitably supported for rotation as by an arm 60 extending from a bracket 62. The output shaft 58 has a collar 64 keyed thereto as at 66. In turn, the collar has a radiating bracket 68 pivotally mounting a pawl 70 preferably, but not necessarily, carrying a roller 72 at its swinging end. The pawl 70 is constantly urged outwardly about its pivot by a compression spring 74 or the like, and affixed to and projecting laterally from the pawl is an actuating arm 76 having a trigger element 78 selectively engageable with a clutch actuating bar 80.

The input shaft 82 of the clutch is carried and driven by the gear 54. The shaft 82, in turn, is hollow and loosely embraces the output shaft 58. A cup-shaped member 84 is mounted on the shaft 82 for rotation therewith and is positioned so that the annular wall 86 thereof surrounds the collar 64 in spaced relation thereto. The annular wall 86 of the member 84 is formed internally with an annular series of inwardly extending lugs 87 selectively engageable with the roller 72 of pawl 70, and when the pawl is swung outwardly by spring 74 as shown in FIGURE 11 the clutch is engaged and the output shaft 58 is driven to thus open gate 24 and distribute material along the bunker as hereinafter more fully described.

An actuator in the nature of a hinged flap or end plate 88 is positioned for pivotal movement at the end of conduit 22. The flap 88 is formed with a vertically elongated aperture or slot therein which permits the shaft extension 50 of auger screw 20 to extend therethrough while also permitting swinging movement of the flap. A pedestal support 90 is secured to the upper edge of flap 88 for swinging movement therewith, and the actuating arm 80 is secured to pedestal 90 to move therewith. One end of the arm 80 extends past the trigger projection 78 of clutch 56 and controls the coupling and uncoupling action of the clutch.

The output shaft 58 of clutch 56 carries a cam 92 rotatable therewith. The extreme outer end of arm 80 extends beyond the trigger 78 of the clutch and rests on cam 92. The output shaft 58 also carries a crank comprised of radius arm 94 and lever 96. Lever 96 is further connected at its opposite end to a gate opening and closing means 98 or by means of an arm 100. The gate opening and closing mechanism comprises a shaft 102 extending through journals 104 mounted on collars 28, and a series of links 106 are secured to and radiate from shaft 102. These links 106 are connected to the gate 24 by links 108 in a manner whereby oscillation or rocking of shaft 102 by the arm 100 causes the linkage 106 and 108 to selectively open or close gate 24.

Initially, clutch 56 is disengaged by arm 80, as shown in FIGURES 1 and 2, so that no rotary power is provided to the output shaft 58 and gate 24 is therefore closed. As the material is moved along conduit 22 by the material distributing auger 20, it is deposited and begins to accumulate in the end of conduit 22 adjacent the end flap 88. The accumulation of material at the end of conduit 22 swings the actuator 88 outwardly as shown by the arrow in FIGURE 1. This movement of flap 88, in turn, actuates the arm 80 and lifts it out of engagement with the trigger projection 78 of clutch 56, thus permitting the clutch 56 to engage as shown in FIGURE 11 to provide rotary power to the output shaft 58. Rotation of output shaft 58 of clutch 56 operates the crank mounted thereon which, through lever 96 and arm 100, rocks the shaft 102 through part of a revolution. The rotation of shaft 102 swings gate 24 away from the center line of conduit 22 by means of links 106 and 108 as shown in FIGURE 3 and allows the material to fall into feeding trough 18. Cam 92 also rotates with output shaft 58 and assures that arm 80 does not reengage the trigger projection 78 until all of the material in conduit 22 has been deposited in bunker 18. When this has occurred, actuator 88 will resume its normal position and arm 80 will again engage trigger projection 78, disengaging clutch 56 and allowing conduit 22 to be refilled by auger screw 20.

It will be appreciated that, during the time gate 24 is opened by the means 48, an undesirable amount of material may pass directly from the hopper 34, into the initial supply portion 36 of conduit 22, and thence into bunker 18. The rotation of the material distributing auger screw 20 during the time gate 24 is opened aggravates this problem. Bunker 18 accordingly becomes unevenly filled due to the large amount of material deposited in the bunker below and adjacent to the initial supply portion 36 of conduit 22. The auger feeder 16 of the present invention includes means for obviating such undesirable accumulations.

FIGURES 1, 2 and 3 illustrate an embodiment of the invention wherein means are provided for segregating the hopper 34 from the initial supply portion 36 to prevent an excessive amount of material from passing from the mixing hopper through the initial feed zones into bunker 18 when gate 24 is open. Specifically, this means comprises a sliding plate inserted within the neck of the hopper between the mixing auger 38 and the initial supply portion 36 of the auger feeder 20 to seal off the hopper and prevent material from passing from the hopper whenever gate 24 is opened.

In this embodiment, the slide plate 108 extends through a pair of openings 110 in neck 35 of hopper 34 immediately below the mixing auger 38. Plate 108 is moved from its open position to closed position when the gate 24 is opened as by means of a rack and pinion mechanism 112. Plate 108 has spaced racks 114 extending therefrom which engage pinion gears 116. Pinion gears 116 are keyed to a common shaft 118 which is operatively connected through levers 120, 122, and 124 to shaft 102. Thus, when shaft 102 is rocked by lever 96 of gate opening means 48, the levers 120, 122 and 124 rotate shaft 118 and pinion gears 116, thereby sliding the plate 108 between open and shut positions.

Operation of the feeder 16 is commenced with gate 24 closed and plate 108 retracted from neck 35 of hopper 34 as shown in FIGURES 1 and 2. With plate 108 in open position, material passes through neck 35 of hopper 34 into the initial feed portion 36 of conduit 22. Motor 40 is energized to rotate both mixing auger 38 and material distributing auger 20. Auger 20 thus moves the material along the length of conduit 22. When the conduit becomes filled, flap 88 will actuate the gate opening means 48 as hereinabove described. As shaft 102 is rocked to open the gate 24, shaft 118 is simultaneously rotated by the levers 120, 122 and 124. As shaft 118 rotates, pinion gear 116 meshing with rack 114 slides plate 108 across the neck 35 to closed position thereby preventing further passage of material from the hopper to the initial supply portion 36 of conduit 22. This prevents an undue accumulation of feed in the bunker directly beneath and adjacent to the initial supply portion of the conduit. When the material in conduit 22 has been deposited in bunker 18, the shaft 102 is caused to rock in the opposite direction to close gate 24, and the return movement of shaft 102 provides a corresponding movement to shaft 118 and causes pinion gears 116 to withdraw plate 108 from the neck 35 of hopper 34. This again places plate 108 in its open position and allows material to pass into initial supply portion 36 of conduit 22 for distribution along the length of auger feeder 16. Also, if desired, the position of pinion gears 116 on rocks 114 may be adjusted so that plate 108 is positioned to only partially block the neck 35 of the hopper 34 when gate 24 is closed, thereby acting as a metering device between the hopper and conduit 22.

Figure 7:
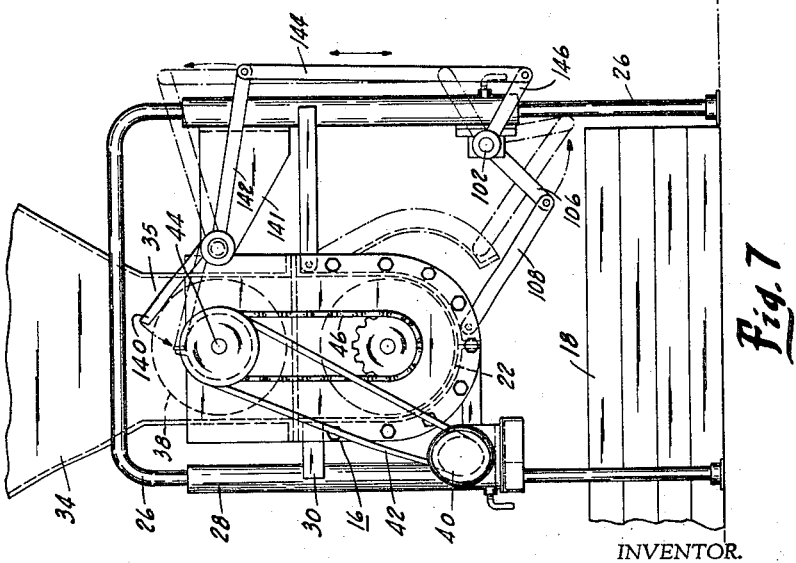
FIGURE 7 is an end view taken along line 7—7 of FIGURE 5 to further show details of the drive mechanism for the auger feeder of FIGURE 5, the various positions of the elements of the auger feeder being shown in solid lines in the closed position of the gate, and the positions of the elements being shown in phantom for the open position of the gate.

Another embodiment of the present invention designed to likewise prevent an undesirable accumulation of material in the bunker directly below and adjacent to the supply hopper and the initial feed portion 36 of conduit 22 is shown in FIGURES 5, 6 and 7. In this embodiment, the various elements of the device which correspond to those already described with reference to FIGURES 1 through 4 are identified by like reference characters.

The embodiment of FIGURE 5 includes means for arresting the material movement action of the auger screw 38 within the initial feed portion of the conduit in order to prevent undue accumulation of material in the bunker. Specifically, the material distributing auger of this embodiment is formed of two coaxially aligned sections with the main auger section extending along the length of conduit 22 beyond the initial feed portion 36. The initial auger section is coaxially aligned with the main auger section and is mounted for independent rotation in the initial feed portion 36 of conduit 22. A clutch is provided to permit the initial auger section and the main auger screw to either be driven simultaneously to distribute material from the hopper along the entire length of the auger feeder 16 or to arrest rotation of the initial auger section when gate 24 is open to stop further feed of material from the hopper to the initial feed portion of conduit 22 and then into bunker 18.

The auger feeder 16 of FIGURE 5 comprises a main auger section 220 and a stub auger section 320. The stub auger section 320 extends below the hopper 34 and across the initial feed portion 36 of conduit 22 while the main auger 220 extends along the remainder of conduit 22. The central shaft 321 of the stub auger 320 is hollow to permit drive shaft 128 of the main auger 220 to extend therethrough. The main auger 220 is keyed to drive shaft 128 as by means of pin 129 and is positioned by bearing hanger 332. Stub auger 320 is journalled in bearings 130 on drive shaft 128 so as to be supported thereby but is capable of rotation independently of the main auger 220.

The main auger 220 is driven from jack shaft 44 by chain 46. Stub auger 320 is rotated only when gate 24 is closed by the action of clutch 132 which selectively drives stub auger 320 from jack shaft 44 by means of chain 134.

Clutch 132 may be similar in construction to clutch 56 with the input shaft thereof consisting of jack shaft 44 and the output shaft 136 thereof surrounding the jack shaft 44 and containing a drive sprocket 138 for the chain 134.

The clutch 132 is engaged and disengaged in the same manner as clutch 56 by placing or removing an arm 140 against a trigger projection, such as 78. Arm 140 is pivoted on bracket 141 and is actuated through levers 142, 144 and 146 from shaft 102. When gate 24 is closed, as is shown in the solid lines in FIGURE 7, arm 140 is raised upwardly, out of contact with trigger projection 78, engaging clutch 132 and permitting output shaft 136 to rotate stub auger screw 320. When gate 24 is opened, by actuation from shaft 102, the rotational movement of shaft 102 causes arm 140 to be lowered by the upward movement of lever 144 to thereby catch trigger projection 78, disengaging clutch 132 and arresting the rotation and material feeding action of stub auger screw 320. This prevents further undersirable feeding of material to the bunker 18.

Summarizing the operation of the device of FIGURES 5 through 7, gate 24 is initially closed and clutch 132 engaged so that the stub auger 320 and the main auger 220 simultaneously rotate to move material from the initial feed zone 36 along the entire length of conduit 22. When conduit 22 is filled, the operation of gate opener 48 is initiated as previously described. As shaft 102 rotates, the lever 140 is swung to engage trigger projection 78. This disengages clutch 132 and arrests the rotation of stub auger 320 which obstructs the initial feed portion 36 of conduit 22, thus preventing any appreciable amount of material from passing from the mixing hopper 34 to bunker 18. The main auger screw continues to rotate, however, since it is driven by jack shaft 44 through chain 46.

When conduit 22 has been emptied along its length, shaft 102 is rotated in the opposite direction to close gate 24. This rotation also causes lever 144 to move downward, raising arm 140 out of engagement with trigger projection 78, re-engaging clutch 132 and allowing the stub auger 320 to again commence rotation to supply feed from initial supply portion 36 to conduit 22.

FIGURES 8 and 9 show an embodiment wherein means are provided for both segregating the mixing hopper 34 from initial feed portion 36 for arresting the material distributing action of the auger screw during the period that the gate means is open. In effect, this embodiment combines the features of both the feeder of FIGURES 1 through 4 and the feeder of FIGURES 5 through 7 and assures proper distribution of feed along the entire length of bunker 18. Since the embodiment of FIGURES 1 through 4 as well as the embodiment of FIGURES 5 through 7 have been described in detail, it is believed that a detailed discussion of the construction of the embodiment shown in FIGURES 8 and 9 is unnecessary.

The auger feeder shown in FIGURES 8 and 9 is operated as follows. When conduit 22 is filled with material, end flap 88 operates gate opener 48, rotating shaft 102 in a direction to open gate 24. This rotation of shaft 102, in turn, rotates shaft 118 through levers 120, 122 and 124. As shaft 118 rotates, pinion gear 116 operating on rack 114 slides plate 108 across neck 35 to the shut position preventing material from passing into initial supply portion 36 of conduit 22 and thence through open gate 24 into bunker 18.

Additionally, the rotation of shaft 102 causes an upward movement of lever 144, swinging lever 140 downwardly so that it engages trigger projection 78. This disengages clutch 132 and arrests the rotation of stub auger 320, blocking the initial feed portion 36. This aids in preventing an undue accumulation of material in bunker 18 adjacent mixing hopper 34.

When gate 24 closes, shaft 118 is rotated in a reverse direction, thereby sliding the plate 108 to its open position by means or rack and pinion mechanism 112. Arm 140 is also raised out of engagement with trigger projection 78 allowing clutch 132 to reengage and permitting the stub auger 320 and the main auger screw 220 to rotate uniformly and move material along conduit 22 to refill the same for commencement of a new cycle.

While a particular type of rack and gear actuating mechanism for the sliding door 108 between the hopper 34 and trough 22 has been shown and described hereinabove for purposes of illustration, it should be understood that such actuating mechanism may be modified without departing from the invention. For example, a somewhat simplified and preferred door actuating mechanism is illustrated in FIGURES 12 and 13. In this embodiment, the rack and pinion and attendant mechanism is eliminated by merely providing a bifurcated lever 350 secured to the shaft 102 for rocking movement therewith, the lever 350 being pivotally connected to the lower end of a rod or lever 352 which is pivotally secured at its medial portion to a fixed pivot 354 with the upper end of lever 350 loosely received by and extending through an aperture 356 in the outer end of the sliding door 108. Thus, when the shaft 102 is rocked, its motion is transmitted to the bifurcated lever 350 and, in turn, to the pivoted lever or rod 352. As the lever 352 swings one way or the other about its fixed pivot 354, the upper end of the lever transmits this motion to the door 108 causing it to slide to either its open or closed position.

Other modifications and embodiments are also contemplated. For example, while a fully mechanical operation has been shown in the above description and accompanying drawings, it will be readily appreciated that electric, pneumatic, hydraulic, or if desired, manual actuating means may be utilized. Also, while the supply hopper 34 is shown at one end of auger feeder 16, it should be understood that the invention is not necessarily limited thereby. Hopper 34 may be located at some other point along the auger feeder, such as in the center with feed distribution extending in opposite directions therefrom.

Various modes of carrying out the invention are contemplated as being within the scope of the following claims particularly pointing out and distinctly claiming the subject matter which is regarded as the invention:

I claim:

1. Feed distributing apparatus, comprising an elongated non-rotatable trough having a material distributing opening extending therealong, means for supplying material to a selected inlet portion of said trough, means operating within said trough for conveying the material from the inlet portion along the length of said trough, a gate normally closing the material distributing opening of said trough, a closure supported for sliding movement between said material supply means and said trough for controlling the supply of material to the inlet portion thereof, and means for periodically actuating said gate to open position and for simultaneously moving said closure to closed position.

2. Feed distributing apparatus according to claim 1, wherein the gate normally closing the material distributing opening is pivotally suspended.

3. Feed distributing apparatus according to claim 2, wherein the means for periodically actuating the gate includes a rock shaft and linkage connecting said shaft with said gate to swing the same about its pivotal suspension.

4. Feed distributing apparatus according to claim 3, wherein the rock shaft is also connected by linkage with the closure for controlling the supply of material to the trough.

5. Feed distributing apparatus according to claim 1, wherein the gate normally closing the material distributing opening and the closure for controlling the supply of material to the trough are both connected to a common actuating means for simultaneous operation.

6. Feed distributing apparatus according to claim 5, wherein the common actuating means includes a rock shaft which is connected to the gate and to the closure by linkage for simultaneous operation thereof.

7. Feed distributing apparatus according to claim 5, wherein the means connecting the closure to the actuating means includes a rack and pinion.

8. Feed distributing apparatus according to claim 7, wherein the rack and pinion is connected to an actuating shaft and said shaft is also connected to the gate.

9. Feed distributing apparatus according to claim 1, wherein the means for conveying the material along the trough is an auger conveyor comprised of at least two sections coupled together for simultaneous operation when the gate is closed and independent operation when the gate is open.

10. Feed distributing apparatus according to claim 9, wherein the auger sections are simultaneously driven when the gate is closed and the operation of the conveyor section located in the zone of the inlet portion is interrupted when the gate is open.

References Cited
UNITED STATES PATENTS 2,940,639    6/1960    Winter _____ 222—76 X
3,319,832    5/1967    Prentice _____ 198—64 X EDWARD A. SROKA, *Primary Examiner.*